March 6, 1962

H. D. FLECK 3,024,185

OZONE GENERATOR AND SYSTEM

Filed Aug. 4, 1958

INVENTOR.
Harry D. Fleck
BY George H. Baldwin
His Atty.

INVENTOR.
BY Harry D. Fleck
George H. Baldwin
His Atty.

United States Patent Office 3,024,185
Patented Mar. 6, 1962

3,024,185
OZONE GENERATOR AND SYSTEM
Harry D. Fleck, Box 751, Jacksonville Beach, Fla.
Filed Aug. 4, 1958, Ser. No. 752,738
1 Claim. (Cl. 204—318)

This invention relates to an improved air-cooled ozonator.

While air-cooled ozonators have been heretofore suggested for the production of ozone for the treatment of water which contains oxidizable materials, such as organic materials, and water from which obnoxious oxidizable gases may be emitted, as well as for the treatment of polluted or odoriferous air, difficulties have been experienced in such devices, particularly where the machine is not constantly attended, where the moisture conditions are adverse, such as in installations where large amounts of water are to be treated, for example, in water purification and sewage treatment plants, and where the operators are not thoroughly famililar with the technical aspects of the machine or are careless in operating it.

It is an object of this invention to provide an ozonating system which will be substantially completely automatic in operation, which embodies safety precautions, wherein back flow of water will not cause shorting or malfunctioning of the ozone producing elements, and wherein ozone is efficiently produced regardless of the moisture conditions in the surrounding atmosphere.

A more specific object of the invention is to provide an improved electrode cooling means in an ozone producing machine, particularly such means as will be effective to prevent cracking or breakage of a glass dielectric element at points adjacent mounting end portions of the ozone-producing electrode assembly.

A further object is to provide, in a treatment system for treating water or other liquids with ozone, means to prevent excessive water pressures or surges of water from introducing water into high-tension apparatus in the ozone producing machine.

The novel features which are believed to be characteristic of this invention are set forth with particularity in the appended claim. The invention itself, however, both as to its organization and method of operation, together with further objects and advantages thereof, may best be understood by reference to the following description taken in connection with the accompanying drawings, in which:

Figure 1:
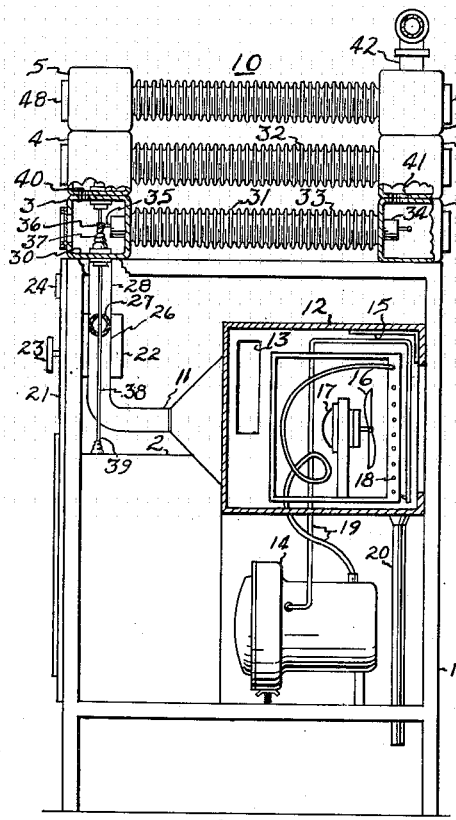
FIG. 1 is a side elevation partially broken away and in section of an ozone generator embodying this invention.

The arrangement as shown in FIG. 1 comprises a suitable frame 1 on which are mounted a high voltage transformer 2, air-receiving chambers 3, 4 and 5, ozone chambers 6, 7 and 8, a plurality of encased electrodes or electrode assemblies generally indicated at 10, an air supply duct 11, which includes an enlarged entrance end portion 12, a refrigerating compressor 14 and a condenser 15. Arranged within end portion 12 of duct 11 are a fan 16 and fan motor 17 and an evaporator coil 18 which is connected through tubes 19 to compressor 14. A side outlet 13 from portion 12 supplies cool dry air to the atmosphere in the room. Drain tube 20 is provided to receive liquid which condenses on evaporator coil 18 and drips therefrom and to dispose of such condensed moisture. Carried on a front panel 21 are a switch 22, with an operating handle 23, and an ammeter 24.

Conduit or duct 11 branches, as at 26, into three conduit portions, of which portions 27 and 28 are shown, each of which opens into the hollow interior of chamber 3 through the bottom wall 30 thereof, at spaced points therealong. The electrodes 10 constitute a group of individual assemblies, such as assembly 31 and assembly 32, each of which comprises an external metal sleeve, such as sleeve 33, a hollow glass cylinder 34 and a metal electrode, not shown in FIG. 1 but indicated as terminating in an electrical connection terminal 35. Terminal 35 is engaged in a clip 36 supported by an insulator 37 and connected through a conductor rod 38 to the high voltage terminal 39 of transformer 2.

Hollow chamber 3 is provided with an opening 40 into chamber 4 and chamber 8 opens into chamber 7 through a similar opening 41. It will be understood that similar openings are arranged to provide communication between chambers 4 and 5 and between chambers 7 and 6. Chamber 6 has an outlet or exhaust duct 42 which functions to carry ozone-rich air from the generator.

Figure 2:
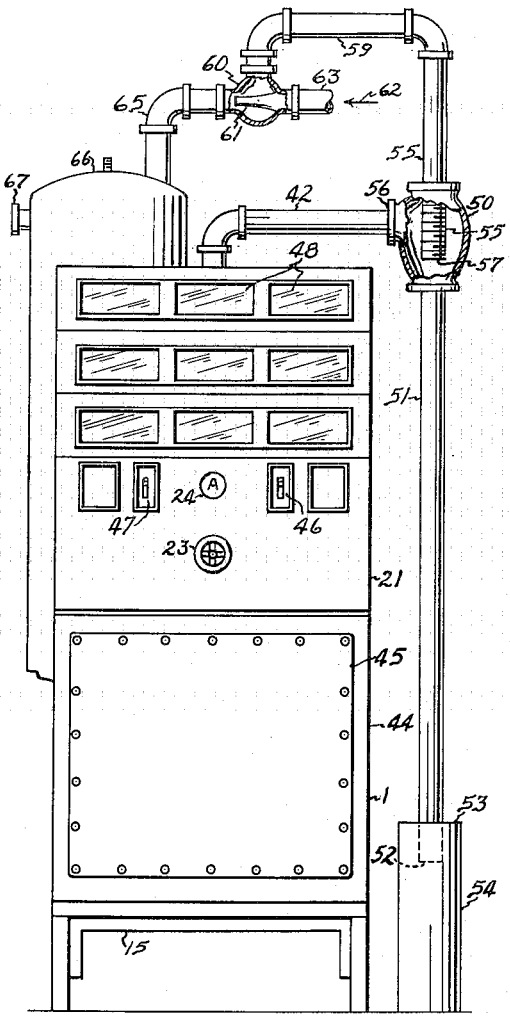
FIG. 2 is a front elevation of a liquid treatment system embodying an ozone generator in accord with FIG. 1, certain portions of the system being broken away and in section.

FIG. 2 shows an ozonating system comprising a generator 44 in accord with FIG. 1, and including a frame 1, a front panel 21 and a removable access plate 45, with a switch control handle 23 and ammeter 24 mounted on the panel. Suitable toggle switches 46 and 47 are also provided and the arrangement of glass windows 48 is indicated. The generator is arranged to supply ozone-rich air through duct 42 into a bell 50. The bell opens downwardly into a pipe 51 having an open lower end 52 disposed below the upper edge 53 of an open topped tank 54. Entering bell 50 from the top is a pipe 55 terminating at a level below inlet 56 into the bell from duct 42 and opening at 57 toward pipe 51 in a manner such that any liquid entering bell 50 through pipe 55 will fall into pipe 51 and, at the lower end of this pipe, into tank 54, and such liquid entering the bell from pipe 55 at a level below duct 42 will not enter duct 42. Pipe 55 extends upwardly from bell 50, as shown at 59, terminating in a chamber 60. Within this chamber is located a liquid jet nozzle or venturi 61 arranged to receive liquid to be treated which flows in the direction of arrow 62 through pipe 63 and is ejected from nozzle 61 within the chamber. As so ejected, the liquid entrains ozonated air supplied through pipe 59 into chamber 60 and flows through a pipe 65 into a suitable retaining tank 66. The water, or other liquid, flows from tank 66 through an outlet 67, with ozonated air entrained therewith.

Two particularly troublesome problems have been encountered in connection with the production of ozone and the treating of liquids with the ozone so produced. One of the problems has to do with the necessity of maintaining substantially complete dryness of the air in and about the electrode portions of the generator and the other the problem of breakage of glass insulators used in connection with the electrodes. The first of these problems in the present arrangement is minimized by the employment of means to extract moisture from the air prior to supplying the incoming air to the electrode portions of the machine, this being a function of the evaporator 18 and drain 20 and the associated elements, and this problem is further minimized by the arrangement associated with bell 50, whereby moisture or quantities of liquid which, in the case of back pressure in tank 66, for example, or from some stoppage of the piping connected therewith, may pass through pipe 59 toward end 57. Such liquid, in the present arrangement, cannot enter duct 42 but falls through pipe 51 into tank 54. Tank 54 is filled with water to above the level of the lower end 52 of pipe 51 thereby to seal the system, and to prevent leakage of ozone-containing air through pipe 51. Excess backflow of liquid down pipe 51 merely causes overflow of tank 54 and causes no damage to the electrodes or other parts of the generating apparatus.

Figure 3:
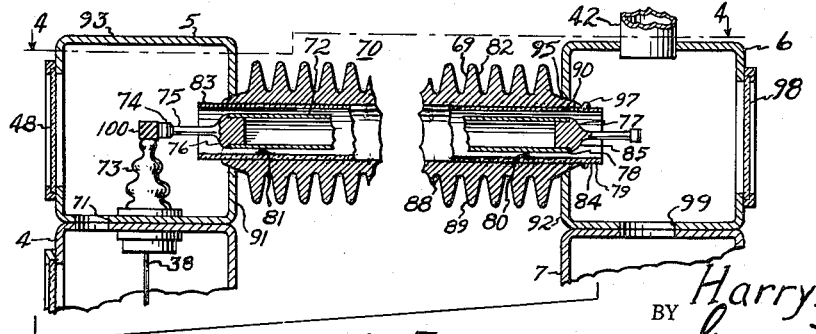
FIG. 3 is a sectional view on an enlarged scale taken generally along the line 3—3 of FIG. 4, showing details associated with the electrode construction and arrangement of the generator.

FIG. 3 discloses the internal construction of a typical electrode assembly 70 and associated elements. The arrangement includes chamber 5 into which cool dry air rises from underlying chamber 4 through opening 71 which communicates between the chambers. A hollow conductive metal cylinder 72 comprises a high voltage element connected by means of conductive rod 38 to the high voltage terminal of the transformer as previously described. The rod 38 extends up through insulator 73 and mounts a clip 74 in which is engaged an end terminal 75 mechanically and electrically connected to the cylinder 72 by means of an end bell portion 76 of the terminal which, as shown, extends a short distance into the end of the hollow cylinder, closing the end. A similar end closure member 77 is provided at end 78 of the cylinder. The member 77 is not used as a connection terminal in the construction as shown but does not interfere with the operation, and permits the reversal of the cylinder 72 at any time desired.

Cylinder 72 is disposed within a hollow cylindrical glass dielectric element 79 and is supported therein by resting upon small non-conductive obsidian lava rest elements 80 and 81 which, as shown, merely rest upon the inner surface 82 of the dielectric cylinder. The rest elements 80 and 81 are arranged, with the cooperation of clip 74 to position the conductive electrode cylinder 72 in aligned coaxial position within the dielectric cylinder. The cylinder 79 has end portions 83 and 84 which extend outwardly beyond the end bell portions 76 and 85 of the respective terminals.

The glass dielectric cylinder element 79 fits closely within a hollow cylindrical outer sleeve 88 formed of aluminum and having external cooling fins 89 formed on its outer surface. The end portions of the sleeve are beveled as seen at 90 and fit securely into complementary beveled openings in the respective walls 91 and 92 of chambers 5 and 6. Opening 95 in wall 92 is seen to provide a close fit with beveled end portion 90 of the sleeve circularly around the sleeve. The fit at each end is formed by hot pressing the sleeve end into the beveled opening and is sufficiently snug or tight to provide not only rigid mechanical support for the sleeve and sealing against escape of air or ozone from the chambers 93 or 94 into the atmosphere but also good heat transfer from the sleeve to the walls. The fit of element 79 in sleeve 88 is sufficiently snug to provide good heat transfer directly from the glass element to the aluminum sleeve. Accordingly, sleeve 88 is cooled by the external atmosphere, the effectiveness of this cooling being increased by fins or ribs 89 of the sleeve, while the ends of the sleeve are additionally cooled by the cool air introduced from duct 11 through openings, such as opening 71 into chamber 5, such air being further supplied through the hollow interior of cylindrical element 79 into chamber 6. The cool air so introduced cools the walls 91 and 92 to a temperature substantially below the temperatures which would exist if the supplied air were not cooled below atmospheric temperature and, as a consequence, the beveled ends, such as end 90, which would otherwise tend to rise in temperature above the temperatures existing elsewhere in the sleeve are effectively cooled. Excess heat is generated in the dielectric cylinder adjacent the ends of the electrode 72, and it will be noted that the ends of the sleeve 88 are located substantially opposite the respective ends of the electrode cylinder. The arrangement shown and described, accordingly, provides desired extra cooling at this point thereby preventing the development of hot spots in the glass element 79 which would tend to crack the glass at this point. The development of such hot spots has been a recurrent and troublesomely difficult problem common to previous constructions.

Each of chambers 3, 4, 5, 6, 7 and 8 is cast of the same alloy of 96 percent aluminum, 3 percent copper and 1 percent tungsten as is employed as the material of which the outer sleeves, such as sleeve 88, are cast. It will be noted that the fins 89 are massive, rather than being of sheet metal, and have walls, such as walls 69 and 82 disposed at substantially 30 degrees to each other. The sleeve of each electrode assembly, accordingly, has substantial heat capacity and provides a large area for dissipating heat to the external atmosphere.

Element 79 is provided with an integral ring 97 engageable against the beveled end 90 of the sleeve for locating the glass element therein. A removable glass window 98 is provided in chamber 6 opposite the ends of the sleeve, cylinder and electrode, whereby the cylinder 79 may be inserted into or withdrawn from operative position by removal of the window 98. In a similar manner, window 48 in chamber 5 may be removed to permit adjustment of end terminal 75 in clip 74. Proper operation of the device, or improper operation, may be recognized by viewing through window 48 along the length of electrode 72, and a similar view may be had from the other end through window 98.

The cool air furnished into the chambers 3, 4 and 5 passes through the ozone generating elements 10, such as between the outer surface of electrode 72 and the inner surface of element 79, into the chambers 6, 7 and 8, respectively, these chambers being connected one to the next through openings such as opening 41 hereinabove described and opening 99 shown in FIG. 3, and the ozonated air exhausts through a duct 42 communicating with chamber 6.

Figure 4:
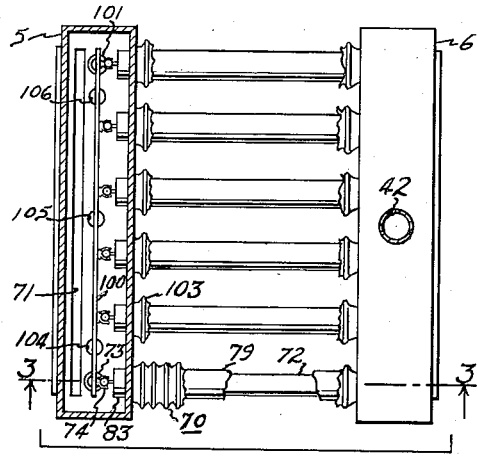
FIG. 4 is a sectional plan view taken generally along line 4—4 of FIG. 3 showing further details of the electrode arrangement, certain portions being broken away and the lower portions of the generator being omitted for the sake of clarity.

The arrangement will be further understood with reference to FIG. 4, wherein it will be seen that a conductive rod 100 is supported between insulators 73 and 101 disposed within chamber 5 and that opening 71 through which the incoming air is supplied comprises an elongated slot extending substantially the whole length of the chamber. A substantially equal flow of air through each of the electrode assemblies 70, 103 into the output chamber 6 is afforded. Conductor rod 100 mounts a terminal clip for the electrode for each assembly, including clip 74 for the electrode assembly 70 as described in connection with FIG. 3. Additional openings, such as openings 104, 105, 106 communicating between the adjoining chambers, may be provided if desired, and these openings may be disposed opposite the entrance openings through which the duct branches, including branches 27 and 28 as shown in FIG. 1, open into the lower chamber 30, thereby to maintain substantially equal rates of flow of air into each of the electrode assemblies. One of openings 104, 105, 106 is disposed between each pair of electrode assemblies, such as is shown for opening 104 disposed between assemblies 70 and 103.

Figure 5:
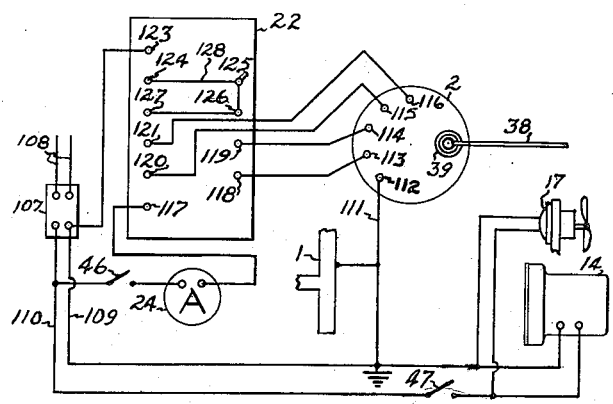
FIG. 5 is a schematic diagram of the electrical system embodied in the generator of FIG. 1.

The operating electrical circuit is shown schematically in FIG. 5 and comprises a fuse or circuit breaker arrangement 107 to which incoming alternating current voltage lines 108 connect and from which power is supplied, upon closure of a switch 46 to switch 22 and transformer 2, and upon closure of switch 47, through lines 109, 110 to the compressor 14 and fan 17. Line 111 connects the ground terminal 112 of transformer 2 and the frame 1 to line 109 and to an external ground. Terminal 112 is common to the primary and secondary windings of the transformer, and a series of taps 113, 114, 115 and 116 are provided for the primary winding, while the secondary winding provides high voltage at terminal 39 to conductor 38.

Switch 22 has a terminal 117 connected through ammeter 24 and switch 46 to line 110 and is operable to complete a connection to a selected one or another of terminals 118, 119, 120 and 121, which are connected to transformer primary winding taps 113, 114, 115 and 116, respectively. Selection of the position of switch 22, accomplished by means of control knob 23, accordingly, applies voltage to the selected transformer primary tap and provides a selected high voltage on terminal 39. In this manner, the secondary voltage may be adjusted in steps to 10,000, 12,000, 14,000 or 16,000 volts. The input terminal 123 of switch 22 is connected to grounded line 109, and terminals 124, 125, 126 and 127 of the switch which are selectively connected with terminal 123 in accord with the position of knob 23 are connected together by a conductor 128.

Figure 6:
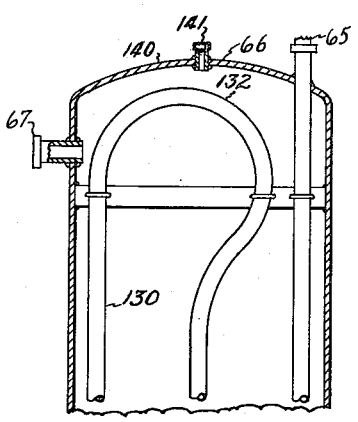
FIG. 6 is a fragmentary and partially sectional view of the retaining tank of the system of FIG. 2 on an enlarged scale, showing the internal arrangement thereof.
Figure 6:
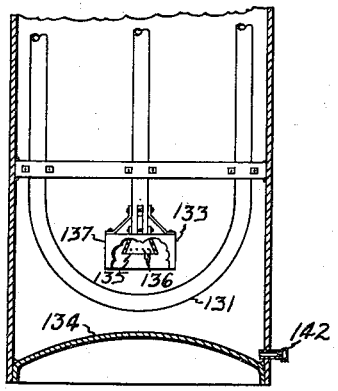

The retention tank of the system as shown in FIG. 6 houses a pipe coil 130 into which the incoming mixture of liquid and ozonated air is introduced through inlet 65. The coil 130 extends in elongated loop turns from near the bottom of the tank at 131 to near the top at 132. The coil terminates in a diffusing outlet arrangement 133 disposed a short distance, such as one foot, from the tank bottom 134. The outlet arrangement 133 includes an inner conical bell 135 provided with a series of small openings 136 in its walls through which ozonated air and water may pass. An open bottom short cylindrical hood 137 encloses the conical bell and forms a trap in which the liquid and ozonated air mix. The pipe coil 130 provides a calculated detention period for the contact of the ozonized air with the liquid being treated. The treated liquid is delivered through bell 135 against the bottom of the tank. From the bottom of the tank the treated liquid is forced upward by the pressure behind the liquid being treated. As the liquid travels upward the swirling motion produced by the diffuser is accentuated and further active contact between the liquid being treated and the ozonized air is obtained. The outlet 67 is provided on the side of tank 66 at a level well above that of the diffuser and, preferably, approximately six inches below the top 140 of the tank. From the outlet 67 the treated liquid is piped to the grid of service or a storage tank, whichever is preferable. Top and bottom pressure relief and drain openings, normally closed, such as are shown at 141 and 142, respectively, may be provided if desired.

While only a certain preferred embodiment of this invention has been shown and described by way of illustration, many modifications will occur to those skilled in the art and it is, therefore, desired that it be understood that it is intended in the appended claim to cover all such modifications as fall within the true spirit and scope of this invention.

What is claimed as new and what it is desired to secure by Letters Patent of the United States is:

In an ozone generator, an electrode assembly comprising an elongated hollow conductive metal cylinder having opposite ends, a hollow glass cylinder having an internal diameter greater by a small fraction of the diameter than the outer diameter of said metal cylinder and having a length greater than the length of said metal cylinder, rest means underlying said metal cylinder and within said glass cylinder supporting said metal cylinder coaxially within said glass cylnder, said glass cylinder having end portions projecting beyond the ends of said metal cylinder, an outer sleeve of heat conductive and electrically conductive material closely surrounding said glass cylinder and having end portions opposite the ends of said metal cylinder, said ends of said metal cylinder being rounded to constitute end bell portions thereof, means to apply a voltage of the order of thousands of volts between said sleeve and said metal cylinder, each said end portion of said sleeve being beveled inwardly toward the respective end portion of the glass cylinder, a respective heat conductive support plate for each end of said sleeve, each of said plates having an opening therein, the edges at said openings being beveled and the openings being proportioned to fit the respective beveled end portions of said sleeve, said plates being in firm engagement on said beveled end portions and in heat conductive relation therewith, the portion of said sleeve between said plates being exposed to the atmosphere and having external cooling fins thereon, air conduit means, an evaporator coil in said conduit, means to cool said coils, said conduit having an air inlet end and an outlet end, a chamber at said outlet end comprising one of said plates as a wall thereof, a second chamber comprising the other said plate as a wall thereof, said beveled end portions extending through and beyond said plates into the interior of the respective chamber and terminating spacedly inwardly of the respective plate, an exhaust outlet for said second chamber, said chambers being in communication through the space outside of said metal cylinder and within said glass cylinder, and fan means in said conduit for causing air to flow into said inlet end, across said coil, into the first said chamber to cool said wall thereof, through said space to be partially converted to ozone, into said second chamber to cool said wall thereof, and out of said second chamber through said exhaust outlet, whereby said end portions of said sleeve are cooled by said air.

References Cited in the file of this patent
UNITED STATES PATENTS

| | | |
|---|---|---|
| 996,560 | Bradley | June 27, 1911 |
| 1,420,838 | Held | June 27, 1922 |
| 1,577,747 | Hartman | Mar. 23, 1926 |
| 1,994,462 | Bueno | Mar. 19, 1935 |
| 2,658,868 | Collison | Nov. 10, 1953 |

FOREIGN PATENTS

| | | |
|---|---|---|
| 3,769 | Great Britain | of 1913 |